July 11, 1939. A. F. SPITZGLASS 2,166,077
REGULATING APPARATUS AND METHOD
Filed Oct. 26, 1936 2 Sheets-Sheet 2

Inventor
Albert F. Spitzglass
by McConkey & Booth
Attorneys

Patented July 11, 1939

2,166,077

UNITED STATES PATENT OFFICE 2,166,077

REGULATING APPARATUS AND METHOD

Albert F. Spitzglass, Chicago, Ill., assignor to Republic Flow Meters Company, Chicago, Ill., a corporation of Illinois Application October 26, 1936, Serial No. 107,650

22 Claims. (Cl. 236—14)

This invention relates to regulating apparatus and methods and more particularly to regulation which is highly sensitive and accurate and at the same time very stable throughout the operating range.

One type of regulator now in use is dependent for its operation on an actual measurement of the condition to be controlled or regulated. This produces an extremely accurate regulation and permits the condition to be maintained within very close limits of the desired value. With so called "metered" or "measured" regulation of this type, however, there may in occasional cases be one part of the operating range where very small changes in regulating force will produce large changes in the control elements for controlling the condition. For example, in a boiler regulator when the boiler is operating at low rating, as when it is banked, very small changes in the regulating force will produce large changes in the rating. This results in a very delicate balance and requires extremely careful adjustment.

Another type of regulation controls according to position rather than to actual measurement of the condition, i. e. for a given demand the control elements are set in a certain position. This type of regulation is extremely stable throughout the entire operating range but is not very accurate, particularly at the high part of the range, and will not permit operation within very close limits.

It is one of the objects of the present invention to combine the two above noted types of regulation to provide, for the cases where a very wide range of operation is desired, metered regulation throughout the major portion of the operating range and position regulation in that portion of the range in which metered regulation is relatively unstable.

Another object of the invention is to provide a regulating system which is responsive to a measurement of a function of the device and which is modified throughout a portion only of the operating range according to the position of a control element.

One arrangement for carrying out the above and other objects of the invention includes a regulator connected to a control element and having sensitive means responsive to a function of the device or condition to be controlled. The regulator preferably includes a resilient element which normally exerts a constant force balanced with the sensitive means and a cam effective during a part only of the operating range to vary the force according to the position of the regulator. The regulator or a plurality of similar regulators may be master loaded, if desired, in which case the master loading force is preferably balanced against the sensitive means and the resilient element.

Other objects, advantages and novel features of the invention including novel elements, subcombinations and regulating methods will be better understood from the following description when read in connection with the accompanying drawings, in which.

Figure 1:
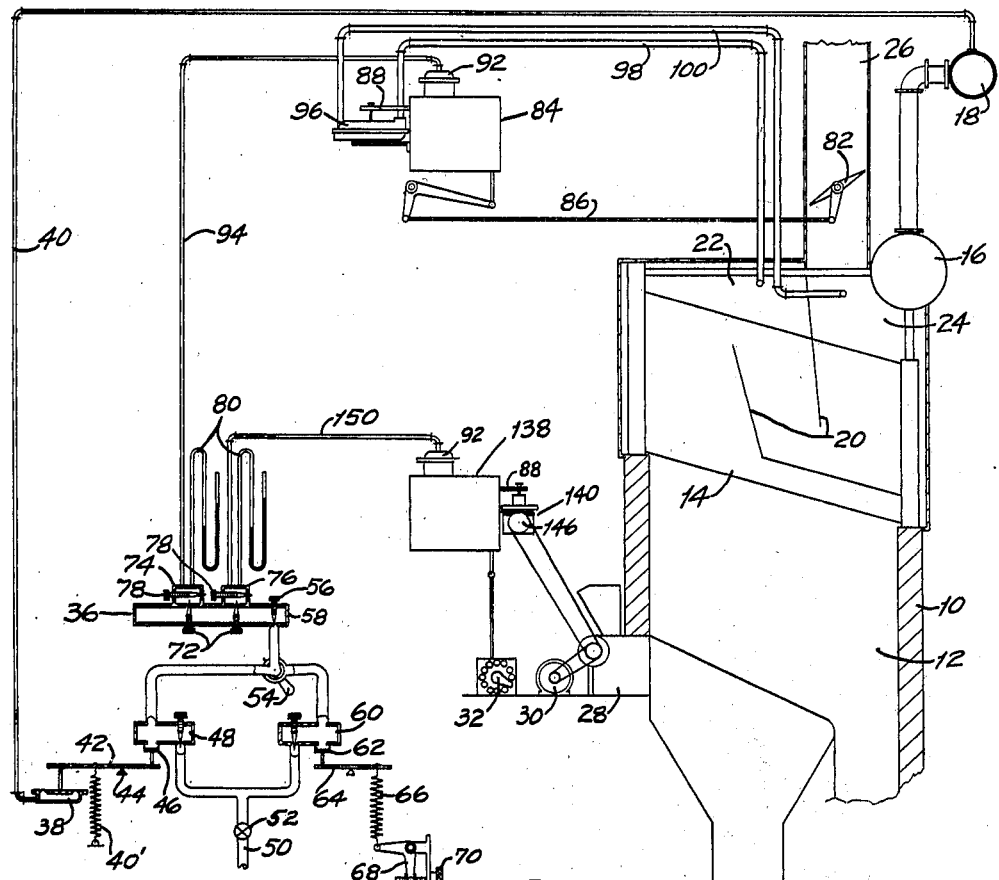
Figure 1 is a diagrammatic view of a boiler regulating system embodying the invention.

Figure 1 illustrates a boiler 10 having a combustion chamber 12 and a bank of water tubes 14 in which steam is generated, the steam passing through a suitable steam drum 16 to a header 18 from which it is distributed to one or more points of use. A plurality of baffles 20 are provided to deflect the hot combustion gases over the tubes and to provide a first pass 22 and a second pass 24, a flue 26 communicating with the second pass.

Fuel is supplied to the boiler by means of a stoker 28 driven by an electric motor 30 which is controlled by a rheostat 32 whereby the rate of fuel feed may be varied. Air for combustion may be drawn into the boiler by natural draft or by an induced draft fan or may be forced into the boiler by a forced draft fan 34 as shown.

The boiler is controlled by a master control system including a master controller indicated generally at 36 and having a diaphragm element 38 connected to the header 18 by a pipe 40. This master controller may be of the type described in Smoot Reissue Patent No. 16,507. The diaphragm 38 acts on one end of a weigh beam 42 balanced about a fixed fulcrum 44 and having its opposite end controlling a cup valve 46 which controls the leakage of air from an air chamber 48. Preferably a fixed spring 40' is connected to the weigh beam to act against the diaphragm 38.

Air is supplied to the air chamber 48 from a constant supply source 50 past a needle valve 52 and passes from the chamber 48 past a throw over valve 54 and a needle valve 56 to an air chamber 58. A chamber 60 is also connected to the supply source 50 and to the throw over valve and has a bleed opening controlled by a cup valve 62 which rests on one end of a weigh beam 64, the opposite end of which is connected to a spring 66. The tension on the spring 66 can be controlled by a bell crank lever 68 and a manual adjusting screw 70. The valve 54 can be operated to connect either the chamber 48 or the chamber 60 to the chamber 58 thereby to provide either automatic or manual control as desired.

The air chamber 58 communicates past needle valves 72 with a pair of air chambers 74 and 76, each having an atmospheric bleed controlled by a needle valve 78. The chambers 74 and 76 are connected to the air and fuel regulators respectively and are preferably provided with manometers 80 which indicate the air-fuel ratio.

Flow of air through the furnace may be controlled by a damper 82 in the flue 26 although it will be apparent that the same effect could be obtained by controlling a suitable valve in the air inlet or by adjusting the speed of the blower 34. The damper 82 is connected to a regulator 84 (Figures 2 and 3) through a suitable linkage 86 so that as the power element of the regulator moves down the damper will be closed and conversely.

The regulator 84 includes a weigh beam 88 balanced about a fixed fulcrum 90 by means of a diaphragm element 92 connected through a pipe 94 with the chamber 74. The opposite end of the weigh beam is connected to a diaphragm 96, the upper surface of which is connected by a pipe 98 with the first boiler pass 22 and the lower surface of which is connected by a pipe 100 with the second boiler pass 24, whereby the diaphragm 96 measures the pressure drop between the two passes and consequently the flow through the furnace. A tension spring 102 is connected at one end to the weigh beam on the same side of the fulcrum as the diaphragm 96 and has its opposite end connected to one end of a bell crank lever 104, the opposite end of which carries a cam roller 106 whose purpose will appear later.

The weigh beam 88 carries a rod 108 whose end is adapted to overlie and to control the effective size of an orifice 110 formed in a body 112. The orifice communicates with one end of a cylinder 114 in which a differential piston 116 is mounted, the piston having an orifice 118 therethrough. Preferably the piston 116 is drilled to form a dash-pot cylinder 120 having a piston 122 therein, the piston being connected to the weigh beam 88 on the same side of the fulcrum as the diaphragm element 92. Fluid, such as oil, under pressure is supplied to the cylinder 114 above the piston 116 through an inlet 124 and after flowing through the openings 118 and 110 is discharged through an outlet 126.

The differential piston 116 carries a rigid arm 128 which is connected to the linkage 86 so that as the piston moves up the damper 82 will be opened and vice versa. The arm 128 is also connected by a link 130 with a rotatably mounted cam 132 which is pivoted adjacent the bell crank lever 104 to engage the roller 106. The major portion of the cam is circular as indicated at 134 to maintain a constant setting of the bell crank lever and hence of the tension of the spring 102; but it is formed adjacent one end with an eccentric portion 136 which will be effective to change the setting of the bell crank lever and spring for a purpose to appear later.

The rheostat 32 which controls the speed of the motor 30 and stoker 28 is controlled by a regulator 138 (Figure 4) which is substantially identical with the regulator 84 and which will, accordingly, not be described in detail. The regulator 138 differs from the regulator 84 mainly in substitution, for the diaphragm element 96, of a speed responsive device 140 of the type fully described and claimed in the patents to Smoot, Nos. 1,361,107, 1,530,740, 1,616,512. The device 140 includes a liquidtight casing 142 having a plurality of radial vanes in its bottom and which is connected to a shaft 144 driven through bevel gears from a pulley 146 which is connected by a suitable driving belt to the stoker. A non-rotatable disc 148 having a series of vanes on its upper surface is mounted in the casing and is connected to one end of the weigh beam 88. As explained in said Smoot patents, the higher the speed of rotation of the casing 142, which is directly proportional to the stoker speed, the greater will be the downward force exerted by the disc 148 on the weigh beam 88. The diaphragm element 92 balances the combined force of the device 140 and the spring 102 and is connected by a pipe 150 with the air chamber 76.

Figure 3:
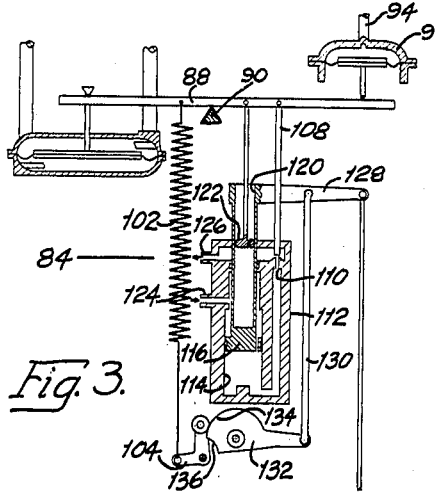
Figure 4:
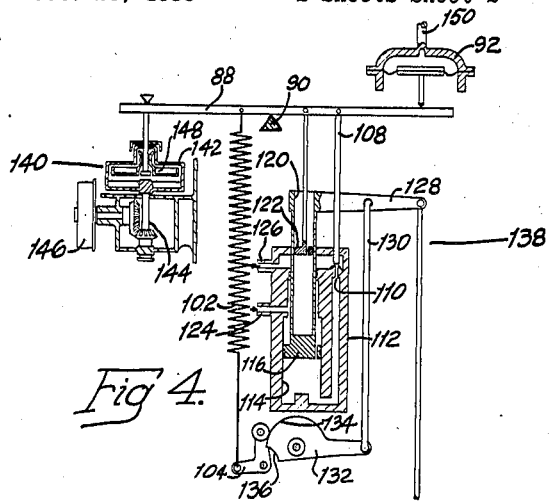
Figure 4 is a similar view of the other regulator.

When the boiler is operating at normal rating the regulators 84 and 138 will occupy substantially the positions shown in Figures 3 and 4 in which the circular portions 134 of the cams 132 engage the rollers 106. With the parts in this position, assume that there is an increased demand for steam, thereby creating a reduction of pressure in the header 18. This will cause a corresponding pressure reduction in the diaphragm chamber 38, permitting the spring 40' to urge the cup valve 46 more tightly against its seat to create an increase of master loading pressure in the chambers 48, 58, 74 and 76. The increased master loading pressure on the diaphragm elements 92 of the regulators will swing the weigh beams 88 clockwise about their fulcrums to lower the valve rods 108 and to restrict the openings 110. This increases the pressure on the lower sides of the differential pistons 116 and causes the pistons to rise, thereby moving the damper 82 and rheostat 32 to new settings to increase the rates of air and fuel supply to the boiler.

As the air flow and stoker speed increase to correspond to the new settings the forces exerted by the diaphragm 96 and the disc 148 will increase to balance the increased forces exerted by the diaphragm elements 92, thereby to produce a new balance of the system with the boiler operating at a higher rating to correspond to the increased demand. However, there will be some time lag before the air flow and stoker speed can increase enough to balance the increased master loading force and the dash pot 120, 122 is provided to anticipate this time lag to prevent over-control and hunting.

It will be noted that as the pistons 116 rise, the dash pot pistons 122 exert a force on the weigh beams 88 to return them to their neutral position and to stop the motion of pistons 116. This force will gradually fade out due to leakage of fluid through the vent in the pistons 122 but as it fades out the stoker speed and air flow will be increasing and by proper calibration of the vent the fading out of the dash pot compensating force can be made to occur at the same speed as the air flow and stoker speed increase. Under these conditions whenever there is a change in demand the regulators will move immediately to the new settings required to satisfy the demand and will remain there until there is a further change in demand. It will be apparent that if there is a reduced demand the movements and forces acting in the system will be exactly the reverse of those described above to reduce the stoker speed and close the damper.

The cams 132 are so designed that the regulators may move a very appreciable amount without running the rollers 106 off of the circular portions 134 so that during this range of movement the tension of springs 102 will remain constant. Thus the system will operate to produce metered control, the weigh beams 88 always being balanced by the master loading force and by functions of boiler operation, i. e., air flow and fuel supply. This is the desired operation during most normal operating ranges, but at extremely low ratings, for example when the boiler is banked, very small changes in the master loading pressure will produce considerably larger than normal changes in rating, and if it should be desired to maintain the steam pressure in the system absolutely constant in such cases, rather careful adjustment would be required. No such accuracy is required, as what is wanted is merely that the regulator should go to a predetermined setting and remain there; at the same time it is desired to have the regulator automatically assume its normal method of control as soon as a load comes on. According to the present invention, the metered system at such low ratings is replaced by substituting a position characteristic to the regulators to make them less sensitive and thereby to increase their stability. At such very low ratings this is sufficiently accurate, as in fact no accuracy of adjustment is at that time required, and it permits the use of a more sensitive adjustment at the higher ratings without sacrificing accuracy.

Figure 2:
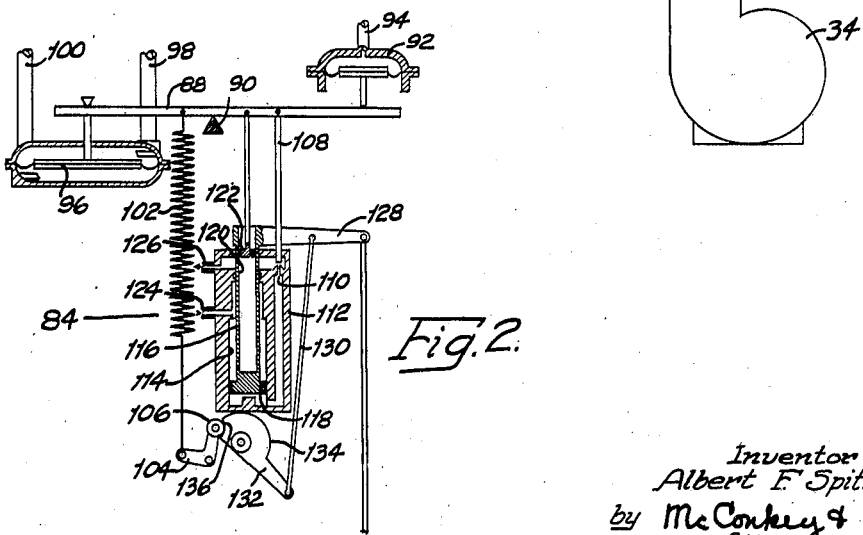
Figures 2 and 3 are more or less diagrammatic sectional views of one of the regulators of Figure 1 showing different positions.

For this purpose the eccentric portions 136 of the cams 132 are arranged to engage the rollers 106 when the regulators are set to produce low rating operation as shown in Figure 2. When this portion of the cams is effective, the tension of springs 102 will be changed for each change of setting of the regulators to produce a variable effect of the springs on the weigh beams according to the positions of the regulators. Obviously the cam portions 136 may be designed to produce any desired type of characteristic and may be made effective during any desired part of the operating range.

Figure 9:
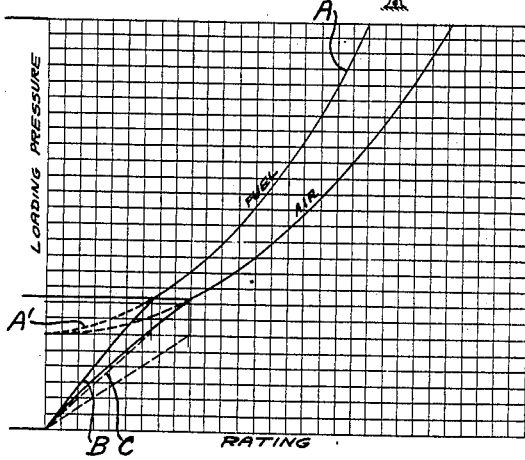
Figure 9 is a chart indicating regulator operation.

Operation of the system is illustrated graphically in Figure 9 in which horizontal distances represent boiler rating and vertical distances represent master loading pressure. Regulator setting is represented by the curve A and its dotted continuation A' for metered operation. The curve is in the form of a square root curve and in its dotted portion A' becomes relatively flat so that small changes in loading pressure will produce large changes in rating. Operation of the cam tends to straighten this curve out and produces operation along the curve B at low ratings, the combined curve A—B being relatively straight so that equal changes in loading pressure will produce substantially equal changes in rating throughout the entire operating range. This causes a much more stable operation of the system at extremely low ratings and gives the desired metered control throughout the normal operating range.

Figure 5:
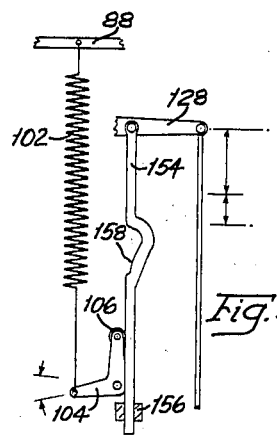
Figures 5, 6, 7 and 8 are partial views of modified constructions.
Figure 6:
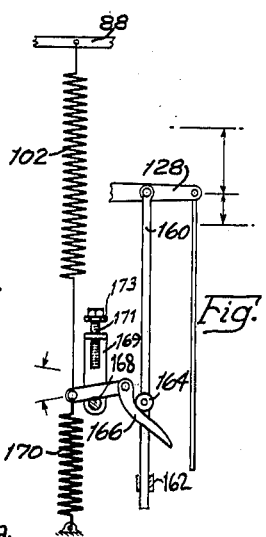
Figure 7:
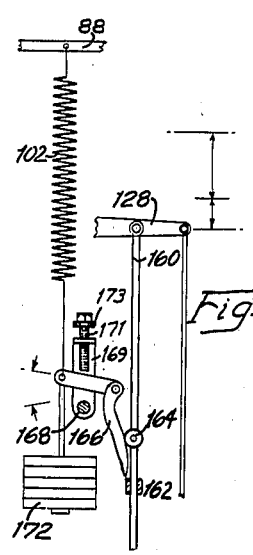

Figures 5, 6 and 7 illustrate different cam arrangements which can be employed in place of the rotatable cam 132, Figure 5 including a cam rod 154 engaging the roller 106 and slidable in a fixed guide 156. The rod 154 includes a straight portion to hold the bell crank lever 104 in constant position and a cam portion 158 to engage the roller 106 and change the setting of the lever 104 and spring 102 during a part of the operating range.

In the arrangement of Figures 6 and 7 a rod 160 is connected to the arm 128 and is slidable in a fixed guide 162. The rod 160 carries a roller 164 for engagement with a cam shaped arm 166 of a bell crank lever, the opposite end of which is connected to the spring 102. The bell crank lever is normally held against a stop 168 by a heavy spring 170 in Figure 6 and by a weight 172 in Figure 7 to provide a constant tension on the spring 102, the bell crank lever being moved about its pivot to vary the tension on spring 102 by engagement of the roller 164 with the cam portion 166 during a part of the operating range.

The stops 168 are preferably mounted on yokes 169 carried by bolts 171 which are rotatably mounted on fixed members 173. By adjusting the bolts 171 the vertical position of the stops 168 can be adjusted to vary the normal positions of the cam arms 166 and consequently to vary the point at which the rollers 164 will engage the cam arms. By this means the range in which the position control is effective can be readily adjusted to adapt the system to different operating conditions.

Figure 8:
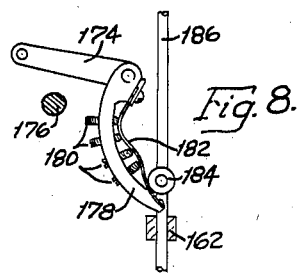

Figure 8 illustrates an adjustable cam adapted to be used in place of the cam portion 166 of Figures 6 and 7 including a bell crank lever having a fixed arm 174 for connection with spring 102 and adapted to engage a fixed stop 176 and a second arm 178 carrying a plurality of adjusting screws 180. A flexible strip 182 overlies the ends of the adjusting screws and is adapted to assume various shapes as the screws 180 are adjusted. The strip 182 engages a roller 184 carried by a rod 186 which operates in the same manner as the rod 160 of Figures 6 and 7. By adjusting the screws 180 the characteristic imparted to the regulator by the cam may be adjusted thereby to vary the curve B of Figure 9 to give the desired operation for any particular case.

It will be apparent that the method of regulation and the regulating apparatus can be applied equally well to boilers fired by oil or gas or can be utilized to control various devices other than boilers. Accordingly, it is not intended that the scope of the invention shall be limited either to boiler control or to the particular apparatus illustrated or otherwise than by the terms of the appended claims.

What is claimed is:

1. The method of controlling a steam boiler or the like which comprises automatically regulating the supply of fuel and air to a boiler in accordance with the balance between a function of the steam generated and functions of the fuel and air flow respectively, and varying said regulation at low boiler ratings in accordance with the positions of elements controlling the fuel and air supply.

2. The method of controlling a steam boiler or the like which comprises balancing a force variable in accordance with a function of the steam generated against another force variable in accordance with the supply of a combustion ingredient, controlling the supply of the combustion ingredient to the boiler in accordance with said balance, and varying said other force throughout a predetermined range only of boiler operation in accordance with the control of the supply of said combustion ingredient.

3. The method of controlling a steam boiler or the like which comprises balancing a force variable in accordance with a function of the steam generated against another force variable in accordance with the supply of a combustion ingredient, controlling the supply of the combustion ingredient to the boiler in accordance with said balance, and varying said other force at low boiler ratings only in accordance with the position of an element controlling the supply of said combustion ingredient.

4. The method of controlling a steam boiler or the like which comprises balancing a force variable in accordance with a function of the steam generated against a normally constant force, varying a master control force in accordance with variations in said balance, balancing said master control force separately against forces varying respectively with functions of the fuel and air supplies to the boiler, controlling the fuel and air supplies respectively in accordance with said last named balances, and varying said last named balances throughout a predetermined range of boiler operation in accordance with variations in the control of the fuel and air supplies respectively.

5. The method of controlling a steam boiler or the like which comprises balancing a force variable in accordance with a function of the steam generated against a normally constant force, varying a master control force in accordance with variations in said balance, balancing said master control force separately against normally constant forces and against forces varying respectively with functions of the fuel and air supplies to the boiler, varying the positions of control elements for the fuel and air in accordance with variations in said last named balances respectively, and varying said last named normally constant forces throughout a predetermined range of boiler operation in accordance with variations in the positions of said control elements respectively.

6. The method of regulating a device having a control element for controlling a factor contributing to operation of the device which comprises measuring a function of operation of the device, measuring a function of said factor, balancing said measurements against each other, adjusting said control element in accordance with said balance, and varying the balance in accordance with variations in the position of the control element during a portion only of the range of adjustment of the control element.

7. A boiler control system comprising a control element for controlling the supply of a combustion ingredient to a boiler, a balance urged in one direction by a force varying in accordance with variations in a function of the steam generated, means responsive to a function of the supply of said ingredient and means creating a normally constant force for urging the balance in the other direction, means operated by said balance for adjusting said control element, and means operated by said control element throughout a predetermined range of movement thereof to vary said normally constant force.

8. A boiler control system comprising control elements for controlling the supply of fuel and air to a boiler, regulators for controlling said elements respectively, said regulators including means balanced by forces varying in accordance with variations in functions of the fuel and air supply respectively and by forces varying in accordance with variations in a function of the steam generated, and means connected to said regulators and adjustable in accordance with the adjustment of said control elements during a predetermined range of boiler operation, to vary said balance means.

9. A boiler control system comprising a plurality of control elements for controlling factors contributing to boiler operation, a plurality of regulators for controlling said elements, each regulator including means balanced by a force variable in accordance with a function of the respective factor, a force variable in accordance with a function of boiler operation and a normally constant force, and means operable only during a predetermined range of boiler operation to vary said normally constant force in accordance with variations in the adjustment of the associated control element.

10. A boiler control system comprising a plurality of control elements for controlling factors contributing to boiler operation, a plurality of regulators for controlling said elements, a master controller responsive to a function of boiler operation for producing variations in a master loading force, each of said regulators including means balanced by said master loading force, a force variable in accordance with a function of the respective factor and a normally constant force, and cam operated means operable during a predetermined range of movement of the control element to vary said normally constant force.

11. A regulating system for a device having a plurality of factors contributing to its operation and a control element for each factor, comprising a master controller responsive to variations in a function of the operation of the device to produce variations in a master loading force, a regulator for each control element including power means and balance means for controlling the power means balanced by said master loading force and a force variable in accordance with variations in the factor, said power means being connected to the control element to adjust it, and means operated by the power means during a portion only of the movement thereof to vary the balance.

12. A regulating system for a steam boiler comprising an air control, a stoker for supplying fuel to the boiler having a speed control, a master controller responsive to steam pressure for producing variations in a master loading force, an air regulator including power means connected to the air control, a weigh beam, means responsive to the master loading force for urging the weigh beam in one direction, a diaphragm responsive to air flow through the boiler and a spring for urging the weigh beam in the other direction, said weigh beam controlling the power means, and a cam operated by movement of the power means during a portion only of its range to adjust said spring in accordance with the position of the power means.

13. A regulating system for a steam boiler comprising an air control, a stoker for supplying fuel to the boiler having a speed control, a master controller responsive to steam pressure for producing variations in a master loading force, a stoker speed regulator including power means connected to the speed control, a weight beam, means responsive to the master loading force for urging the weigh beam in one direction, a device responsive to stoker speed and a spring for urging the weigh beam in the other direction, said weigh beam controlling the power means, and a cam operated by movement of the power means during a portion only of its range to adjust said spring in accordance with the position of the power means.

14. A regulator comprising power means, balance means for controlling the power means, sensitive devices acting in opposite directions on the balance means, an elastic member connected to the balance means and assisting one of the sensitive devices to urge it in one direction, and means operated by the power means during a portion only of its movement for varying the tension of the elastic member.

15. A regulator comprising power means, balance means for controlling the power means, sensitive devices acting in opposite directions on the balance means, an elastic member connected to the balance means and assisting one of the sensitive devices to urge it in one direction, and a cam operated by the power means and effective during a portion only of the movement thereof and cooperating with said elastic member for varying the tension thereof.

16. A regulator comprising power means, balance means for controlling the power means, sensitive devices acting in opposite directions on the balance means, an elastic member connected to the balance means and assisting one of the sensitive devies to urge it in one direction, a rotary cam mounted on a fixed pivot and having a circular portion and a non-circular portion, said cam controlling the elastic member whereby the tension of the elastic member will be constant when the circular portion of the cam is effective and will be varied when the non-circular part of the cam is effective, and a connection from the cam to the power means.

17. A regulator comprising reciprocable power means, balance means for controlling the power means, sensitive devices acting in opposite directions on the balance means, an elastic member connected to the balance means and assisting one of the sensitive devices to urge it in one direction, and cam means connected to the elastic member and to the power means and operated by reciprocating movement of the power means during a portion only of its range of movement to vary the tension on the elastic member.

18. A regulator comprising reciprocable power means, balance means for controlling the power means, sensitive devices acting in opposite directions on the balance means, an elastic member connected at one end to the balance means and assisting one of the sensitive devices to urge it in one direction, a bell crank lever mounted on a fixed pivot and connected at one end to the other end of the elastic member, an adjustable cam member on the bell crank lever, and a roller moved by the power means and engageable with said cam member to vary the tension on the elastic member during a part only of the movement of the power means.

19. A regulator comprising reciprocable power means, balance means for controlling the power means, sensitive devices acting in opposite directions on the balance means, an elastic member connected at one end to the balance means and assisting one of the sensitive devices to urge it in one direction, a bell crank lever mounted on a fixed pivot and connected at one end to the other end of the elastic member, a flexible strip carried by the other end of the bell crank lever, adjusting screws extending through the lever and engaging the strip whereby the shape of the strip may be changed, and a pin moved by the power means and engageable with the strip to vary the tension on the elastic member.

20. A boiler control system comprising a regulator for regulating a control element governing a factor contributing to boiler operation, said regulator including means responsive to a function of boiler operation and to a function of said factor to control the boiler throughout a portion of its range in accordance with a measure of said functions, said regulator also including means responsive to the position of said control element to control the boiler throughout another portion of its range in accordance with the position of the element.

21. A boiler control system comprising a regulator for regulating a control element governing a factor contributing to boiler operation, said regulator including means responsive to a function of boiler operation and to a function of said factor to control the boiler throughout its range in accordance with a measure of said functions to effect a metered control, said regulator also including means responsive to the position of said control element to superimpose a position characteristic on said metered control throughout a portion of the boiler range.

22. A boiler control system comprising a regulator for regulating a control element governing a factor contributing to boiler operation, said regulator including means responsive to a function of boiler operation and to a function of said factor to control the boiler throughout its range in accordance with a measure of said functions to effect a metered control, said regulator also including means responsive to the position of said control element to superimpose a position characteristic on said metered control throughout the lower portion of the boiler operating range.

ALBERT F. SPITZGLASS.